United States Patent

Niles

[15] 3,706,363
[45] Dec. 19, 1972

[54] LAWN MOWER FRICTION DRIVE WITH SLIP CLUTCH

[72] Inventor: Donald E. Niles, Nashotah, Wis.

[73] Assignee: Outboard Marine Corporation, Waukegan, Ill.

[22] Filed: June 15, 1971

[21] Appl. No.: 153,356

[52] U.S. Cl. .................. 192/3.54, 74/194, 192/3.62
[51] Int. Cl. ...................... F16h 15/08, B62d 51/04
[58] Field of Search ..... 192/3.51, 3.54, 3.62; 74/194; 180/19 H

[56] References Cited

UNITED STATES PATENTS

| | | | |
|---|---|---|---|
| 1,218,564 | 3/1917 | Jonas | 74/194 |
| 2,823,560 | 2/1958 | Harp et al. | 192/3.63 X |
| 3,445,991 | 5/1969 | Hanson et al. | 74/194 X |
| 3,527,112 | 9/1970 | Korell | 74/194 |
| 3,613,814 | 10/1971 | Prien | 74/194 |

Primary Examiner—Benjamin W. Wyche
Attorney—Robert E. Clemency et al.

[57] ABSTRACT

Disclosed herein is a lawn mower including a friction drive comprising a clutch disc connected to a driving engine, a clutch plate mounted in facing relation to the clutch disc and for clutch plate rotation co-axially with and independently of the clutch disc, as well as for axial movement relative to a position in engagement with the clutch disc, together with a roller which is drivingly connected to a mower drive wheel, which includes a circular periphery, and which is mounted for rotation about an axis transverse to the clutch disc and plate axis and for translation about another axis parallel to the roller axis into a position engaging the roller periphery with the clutch plate in such manner as to more or less also simultaneously engage the clutch plate with the clutch disc. In addition, there is disclosed means biasing the roller toward the clutch disc, whereby to engage the roller periphery with the clutch plate and to engage the clutch plate with the clutch disc, and means operable by a user for controlling movement of the roller relative to the position engaging the roller periphery with the clutch plate.

7 Claims, 2 Drawing Figures

PATENTED DEC 19 1972   3,706,363

Inventor
Donald E. Niles
By Robert E. Clemency
Attorneys

LAWN MOWER FRICTION DRIVE WITH SLIP CLUTCH

BACKGROUND OF THE INVENTION

The invention relates generally to lawn mowers and particularly to lawn mowers including friction drives. One example of a prior construction is disclosed in the Puffer et al. U.S. Pat. No. 3,667,304, issued June 6, 1972, from application Ser. No. 69,255 filed Sept. 3, 1970, and titled "Riding Lawn Mower Friction Drive." Another example of a lawn mower friction drive is found in the United States Prien U.S. Pat. No. 3,528,395, issued Sept. 15, 1970, from application Ser. No. 32,644 filed Apr. 28, 1970, and titled "Variable Speed Drive for Lawn Mower".

Friction drives such as those disclosed in U.S. Pat. No. 3,667,304 subject the rubber periphery of the driven roller to considerable wear such that, the effective life of the friction drive arrangement often is determined by the life of the rubber periphery of the drive roller. In this regard, when the transmission or friction drive is engaged, slippage between the driven roller and the driving member occurs until the input and output speeds are synchronized. Such slippage causes substantial wear on the driven roller and materially shortens its life.

SUMMARY OF THE INVENTION

The invention provides a lawn mower friction drive which includes a driven roller having a rubber or rubber-like periphery engageable with the driving member to transmit power, together with the employment of a slip clutch located intermediate a suitable power source and the driven roller. In its broadest aspect, the slip clutch could be located in the drive train anywhere between the power source and the ultimately driven element.

In accordance with the invention, there is provided an intermediate clutch plate which is co-axially and rotatably mounted in relation to a driving disc and which includes a surface drivingly engageable with the driving disc. Located for movement into engagement with the intermediate disc in a manner so as to also engage the intermediate clutch plate with the driving disc is a driven roller having a rubber or rubber-like periphery.

One of the principal objects of the invention is the provision of a lawn mower friction drive which includes a driven roller having a rubber or rubber-like periphery and which is arranged so as to decrease wear of the rubber periphery.

Another of the principal objects of the invention is the provision of a friction drive which is especially adapted for lawn mower use and which includes an intermediate clutch plate mounted for rotation in co-axial relation to a driving disc and movable into a position of driving engagement therebetween, together with a driven roller which includes a rubber or rubber-like periphery and which is movable so as to frictionally and drivingly engage the intermediate clutch plate and so as to more or less simultaneously effect frictional engagement between the driving disc and the intermediate clutch plate.

Another of the principal objects of the invention is the provision of a friction drive as referred to in the preceding paragraph in which the intermediate clutch plate has a relatively low rotary inertia as compared to the inertia associated with the roller having a rubber or rubber-like periphery.

Another of the principal objects of the invention is the provision of a transmission for a lawn mower including a clutch having a driven element with a rubber or rubber-like engaging surface or element and an additional slip clutch arranged to facilitate reduction in slippage between the rubber element and the element engaged thereby, so as to reduce wear on the rubber element.

Another of the principal objects of the invention is the provision of a lawn mower friction drive or transmission including a driven roller having a rubber periphery and additional slip clutch means affording protection against excessive wearing of the rubber periphery of the driven roller.

Still another of the principal objects of the invention is the provision of a lawn mower friction drive transmission which is economical to manufacture and which will provide reliable service over a long and useful life.

Other objects and advantages of the invention will become known by reference to the following description and accompanying drawings.

DRAWINGS

GENERAL DESCRIPTION

Figure 1:
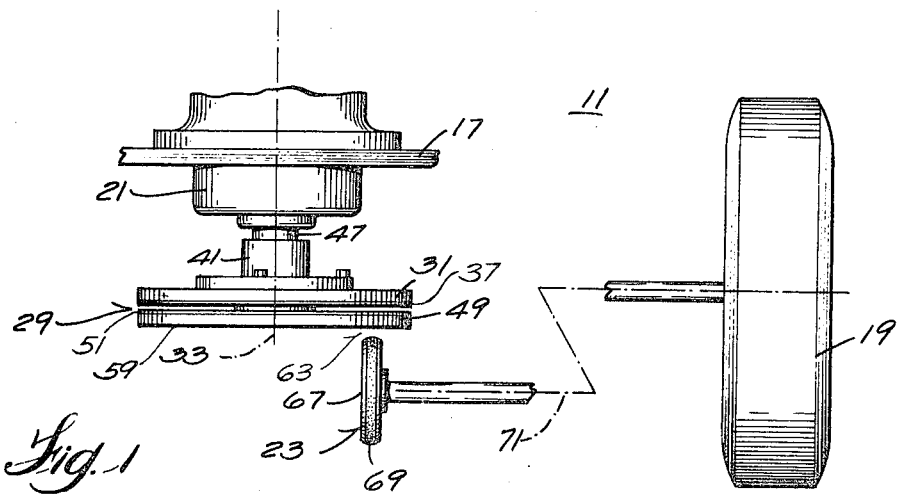
FIG. 1 is a schematic view of a lawn mower friction drive in accordance with the invention.

Shown schematically in FIG. 1 is one embodiment of a lawn mower 11 which includes a friction drive embodying various of the features of the invention and which constitutes a modification of the riding lawn mower and friction drive disclosed in the Puffer and Duncan U.S. Pat. No. 3,667,304, issued June 6, 1972, from application Ser. No. 69,255, filed Sept. 3, 1970, and titled "Riding Lawn Mower Friction Drive," which Puffer and Duncan patent is incorporated herein by reference.

Figure 2:
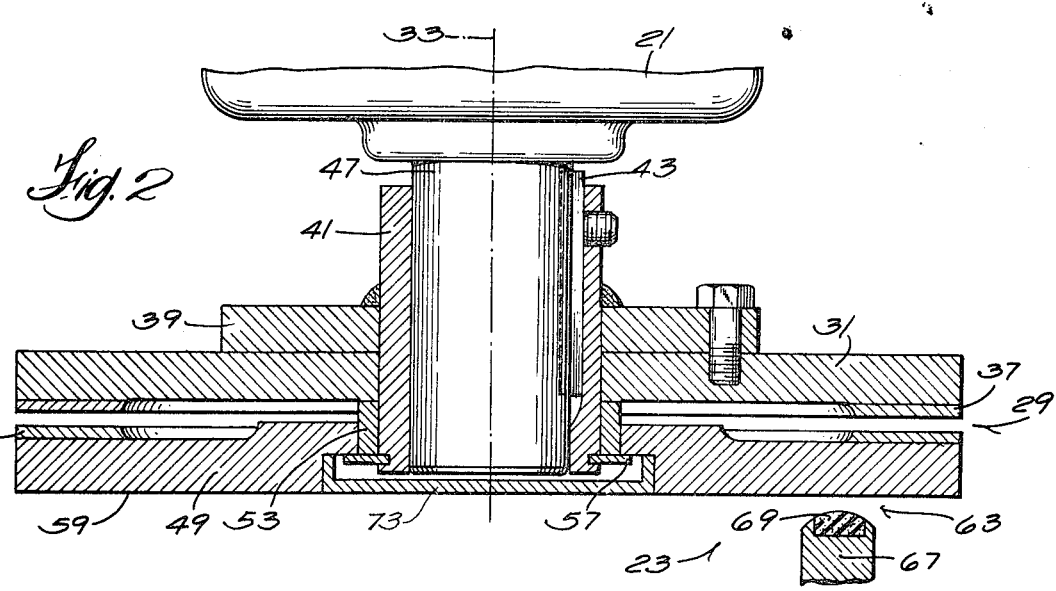
FIG. 2 is a fragmentary view of various of the components of the friction drive shown in FIG. 1.

The lawn mower 11 includes (see FIG. 2 herein a frame 17 (numeral 21 in the Puffer et al. patent), a ground engaging drive wheel 19 (numeral 19 in the Puffer et al. patent) rotatably supported on the frame 17, and an engine 21 (numeral 27 in the Puffer et al. patent) supported on the frame 17, together with a drive train 23 connected between the engine 21 and the ground engaging drive wheel 19.

In accordance with the invention, the drive train includes a first clutch comprising a driving rotatable element having a clutch surface and a roller which includes a circular rubber or rubber-like periphery and which is mounted for rotation about an axis transverse to the rotational axis of the driving element and for movement relative to a position frictionally engaging the periphery with the driving element, together with a slip clutch which comprises a driving rotatable member and a rotatably, co-axially located driven member frictionally engageable with the driving member and having a rotary inertia less than the rotary inertia associated with the roller.

While other constructions can be employed, in the illustrated construction the friction drive or drive train 23 includes a slip clutch 29 including a clutch disc 31 (numeral 41 in the Puffer et al. patent) which is drivingly connected to the engine 21 and which is suitably mounted on the frame 17 for rotation about an axis 33. In the specifically illustrated construction (See FIG. 2) the clutch disc 31 can include an annular band or ring or surface 37 of friction material and is bolted or otherwise fixed to a flange 39 extending fixedly from a hub 41 which is keyed at 43 or otherwise suitably fixed to a shaft 47 journaled for rotation by the frame 17 about the axis 33 and driven by the engine 21.

Also in accordance with the invention, the slip clutch 29 includes a clutch plate or element 49 which is mounted for rotation independently of and co-axially with the clutch disc 31, as well as for movement along the clutch disc axis 33 relative to a position of driving engagement by the clutch disc 31. In this regard, the clutch plate 49 can have mounted thereon a ring or band or surface of friction material 51 which is engageable with the ring or band 37 on the clutch disc 31.

While other arrangements for mounting the clutch plate 49 can be employed, in the construction illustrated in FIG. 2, the clutch plate mounting means comprises a bushing or bearing 53 which encircles a portion of a hub 41 and which supports the clutch plate 49 for rotation independently of the clutch disc 31. A snap ring 57 is employed to retain the bushing 53 in proper place and to limit axial movement of the clutch plate 49 away from the clutch disc 31.

Also in accordance with the invention, the clutch plate 49 includes an outer face or surface 59 constituting the driving member of a second clutch 63 which includes a driven member 67 in the form of a roller or wheel (numeral 43 in the Puffer et al. patent). More specifically, the driven member 67 includes an outer periphery or surface 69 (numeral 47 in the Puffer et al. patent) of rubber or rubber-like material and is drivingly connected as explained in the Puffer et al. patent to the drive wheel 19. The driven roller 63 is mounted both for rotation about an axis 71 perpendicular to the to the rotational axis 33 of the clutch plate 31 and for movement toward and away from a position wherein the roller 67 engages the face 59 of the clutch plate 49 so as to afford driving engagement therebetween in such manner as to more or less simultaneously frictionally engage the rubber periphery 69 of the roller 67 with the outer face 59 of the clutch plate 49 to effect driving engagement therebetween and to frictionally engage the bands 37 and 51 of the clutch plate 49 and clutch disc 31.

While various arrangements can be employed to afford movement of the roller 67 toward and away from the clutch plate 49, the illustrated construction contemplates mounting of the roller 67 for pivotal movement about an axis parallel to the rotational axis 71, i.e., the rotational axis of the shaft 67 in the Puffer et al. patent.

Also in accordance with the invention, means are provided for biasing the roller 67 about the just mentioned axis and toward the clutch plate 49 and clutch disc 31, whereby to essentially simultaneously effect engagement of the roller 67 with the clutch plate 49 and engagement of the clutch plate 49 with the clutch disc 31. While various arrangements could be employed, the disclosed construction contemplates employment of the springs 113 and 123 disclosed in the Puffer et al. patent.

Also in accordance with the invention, there is provided means operable by a user for controlling movement of the roller 67 relative to the position which effects engagement of the rubber periphery 69 with the face 59 of the clutch plate 49 and engagement of the clutch plate 49 with the clutch disc 31. While various arrangements can be employed, the disclosed construction contemplates employment of the rod 137 and associated structure disclosed in the Puffer et al. patent.

Also in accordance with the invention, the roller 67 is also movable axially of the axis 71 across the outer face 59 of the clutch plate 49 to provide variation in speed, as well as forward and reverse drive. While various constructions can be employed, the disclosed construction contemplates the arrangement disclosed in the Puffer et al. patent including the Puffer bell crank lever 89 and the Puffer rod 111 and the associated connections therebetween and with the Puffer roller 43. In this regard, the outer face 59 of the clutch plate 49 is constructed so as to be planar or flush. Further in this regard, the outer face 59 of the clutch plate 49 is accordingly provided with a cap 73 which encloses the outer end of the hub 41 and the shaft 47, while simultaneously providing a completely flush surface for engagement with the driven roller 67.

Also in accordance with the invention, the rotary inertia of the clutch plate 49 is less than the rotary inertia associated with the driven roller 67 as the inertia of the driven roller 67 includes the drive train components leading to and including the rotary wheel 19.

In operation, shifting of the driven roller 67 from a position spaced from the face 59 of the clutch plate 49 toward the face 59 of the clutch plate 49 serves both to drivingly engage the roller 67 with the clutch plate face 59 and to displace the clutch plate 49 axially to drivingly engage the clutch plate 49 with the clutch disc 31.

The drive train between the driven roller 67 and the drive wheel 19 presents substantial resistance to rotation of the driven roller and, accordingly at least initially, slippage will accordingly result between the engine 21 and the drive wheel 19. Because the inertia of the clutch plate 49 is less than the inertia or resistance to rotation offered by the driven roller 67, initial engagement of the roller 67 with the clutch plate 49 and of the clutch plate 49 with the clutch disc 31 results initially in substantial slippage between the clutch disc 31 and the clutch plate 49 and in substantial elimination of slippage between the roller 67 and the clutch plate 49. Such elimination of slippage substantially increases the life of the rubber periphery 69 of the roller 67 while the employment of brake bands or surfaces or other friction material for the clutch plate and disc surfaces 51 and 37, respectively, also serves to assist in providing a long life for the disclosed friction drive.

With respect to the friction drive disclosed in the Prien, Jr., U.S. Pat. No. 3,528,395, various of the advantages of the invention disclosed herein can be obtained by employing a slip clutch between the Prien roller 48 and the Prien disc 46.

Various of the features of the invention are set forth in the following claims.

What is claimed is:

1. A lawn mower comprising a frame, a drive wheel rotatably supported on said frame, an engine supported on said frame, a clutch disc connected to said engine and mounted on said frame for rotation about a first axis, a clutch plate having first and second parallel surfaces, means mounting said clutch plate with said first surface located in facing relation to said clutch disc and for rotation co-axially with and independently of said clutch disc and for axial movement relative to a position with said first surface engaging said clutch disc, a roller drivingly connected to said drive wheel and having a circular periphery, means mounting said roller for rotation about a second axis transverse to said first axis and for movement about a third axis parallel to said second axis into a position engaging said periphery with said second surface of said clutch plate, means biasing said roller about said third axis and toward said clutch disc, whereby to engage said roller with said clutch plate and to engage said clutch plate with said clutch disc, and means operable by a user for controlling movement of said roller relative to said position engaging said periphery with said clutch plate second surface.

2. A lawn mower comprising a frame, a drive wheel rotatably supported on said frame, an engine supported on said frame, and a drive train connected between said engine and said drive wheel and including a first clutch comprising a driving rotatable element having a clutch surface and a roller including a circular periphery, said roller being mounted for rotation about an axis transverse to the rotational axis of said element and for movement relative to a position frictionally engaging said periphery with said element surface, a second clutch comprising a driving rotatable member and a driven member frictionally engageable with said driving member and having a rotary inertia less than the rotary inertia associated with said roller, and means for simultaneously engaging said first and second clutches.

3. A friction drive comprising a clutch disc mounted for rotation about a first axis and adapted to be driven by a power source, a clutch plate having first and second parallel surfaces, means mounting said clutch plate with said first surface located in facing relation to said clutch disc and for rotation co-axially with and independently of said clutch disc and for axial movement relative to a position with said first surface engaging said clutch disc, a roller adapted to be drivingly connected to a driven member and having a circular periphery, and means mounting said roller for rotation about a second axis transverse to said first axis and for movement relative to a drive position engaging said periphery with said second surface of said clutch plate.

4. A friction drive in accordance with claim 3 and further including means biasing said roller toward said clutch disc, whereby, more or less to simultaneously engage said roller with said clutch plate and to engage said clutch plate with said clutch disc, and means operable by a user for controlling movement of said roller relative to said position engaging said periphery with said clutch plate second surface.

5. A friction drive in accordance with claim 3 wherein said roller is movable relative to said drive position about a third axis parallel to said second axis.

6. A friction drive in accordance with claim 3 wherein said roller is movable in directions axially of said second axis and means for moving said roller in said directions axially of said second axis.

7. A friction drive in accordance with claim 3 wherein said periphery is of rubber or rubber-like material.

* * * * *